United States Patent
Tsukamoto

(10) Patent No.: US 9,387,605 B2
(45) Date of Patent: Jul. 12, 2016

(54) METHOD FOR PRODUCING REINFORCEMENT ELEMENTS FROM FIBRE-REINFORCED PLASTIC

(71) Applicant: FiReP Rebar Technology GmbH, Dusseldorf (DE)

(72) Inventor: Kenichi Tsukamoto, Meerbusch (DE)

(73) Assignee: FiReP Rebar Technology GmbH, Dusseldorf (DE)

( * ) Notice: Subject to any disclaimer, the term of this patent is extended or adjusted under 35 U.S.C. 154(b) by 7 days.

(21) Appl. No.: 14/424,514

(22) PCT Filed: Jul. 15, 2013

(86) PCT No.: PCT/EP2013/064956
§ 371 (c)(1),
(2) Date: Feb. 27, 2015

(87) PCT Pub. No.: WO2014/032846
PCT Pub. Date: Mar. 6, 2014

(65) Prior Publication Data
US 2015/0204075 A1     Jul. 23, 2015

(30) Foreign Application Priority Data
Aug. 31, 2012   (DE) .......................... 10 2012 108 132

(51) Int. Cl.
*B29C 35/02*   (2006.01)
*B29C 70/52*   (2006.01)
(Continued)

(52) U.S. Cl.
CPC ......... *B29C 35/0266* (2013.01); *B29C 35/0805* (2013.01); *B29C 35/10* (2013.01); *B29C 53/083* (2013.01); *B29C 70/50* (2013.01);
(Continued)

(58) Field of Classification Search
None
See application file for complete search history.

(56) References Cited

U.S. PATENT DOCUMENTS 4,620,401 A * 11/1986 L'Esperance ......... B29C 70/205
411/424
6,023,903 A   2/2000 Stecker
(Continued)

FOREIGN PATENT DOCUMENTS

EP   1094171 A2   4/2001

OTHER PUBLICATIONS

International Search Report dated Dec. 3, 2013 issued in corresponding PCT/EP2013/064956 application (pp. 1-2).
(Continued)

*Primary Examiner* — Benjamin Schiffman
(74) *Attorney, Agent, or Firm* — Millen White Zelano and Branigan, PC; John Sopp; Anthony Zelano

(57) ABSTRACT

A method for manufacturing a reinforcing member (2) consisting of fiber-reinforced plastic for mineral construction materials, in particular for concrete. In the method, curing the composite fiber rod (1) takes place in at least three stages (7, 16, 25) sequencing one after another, wherein after the first stage of curing (7) at least one radiation-reflecting and/or thermally-insulating covering agent (15) is applied onto the pre-cured composite fiber rod (1), wherein a second stage of curing (16) of the composite fiber rod (1), together with the covering agent(s) (15) applied is executed, in which the composite fiber rod (1) is further cured in the regions (14) not covered by the covering agents (15) by the supply of heat and/or radiation, and wherein the deformation (23) of the composite fiber rod (1) is executed between the second stage of curing (16) and the final stage of curing (25).

15 Claims, 3 Drawing Sheets

(51) Int. Cl.
*B29C 70/54* (2006.01)
*E04C 5/07* (2006.01)
*B29C 35/08* (2006.01)
*B29C 35/10* (2006.01)
*B29C 53/08* (2006.01)
*B29C 70/50* (2006.01)
*B29K 101/10* (2006.01)
*B29K 105/10* (2006.01)
*B29L 31/06* (2006.01)

(52) U.S. Cl.
CPC .............. *B29C 70/52* (2013.01); *B29C 70/542* (2013.01); *E04C 5/07* (2013.01); *E04C 5/073* (2013.01); *B29C 2035/0822* (2013.01); *B29K 2101/10* (2013.01); *B29K 2105/106* (2013.01); *B29L 2031/06* (2013.01)

(56) References Cited

U.S. PATENT DOCUMENTS

| | | | | |
|---|---|---|---|---|
| 6,061,902 | A * | 5/2000 | Kalamkarov | H01B 15/005 29/33 M |
| 6,221,295 | B1 * | 4/2001 | Kaiser | B29C 70/525 156/180 |
| 6,263,629 | B1 | 7/2001 | Brown, Jr. | |
| 6,485,660 | B1 * | 11/2002 | Kaiser | B29C 70/525 156/180 |
| 6,493,914 | B2 * | 12/2002 | Kaiser | B29C 70/525 156/180 |
| 7,513,970 | B2 * | 4/2009 | Stafset | E04C 5/07 156/169 |
| 8,511,038 | B2 * | 8/2013 | Brandstrom | E04C 5/07 52/125.1 |
| 8,673,101 | B2 * | 3/2014 | Brandstrom | B29C 70/32 156/173 |
| 2009/0022940 | A1 | 1/2009 | Weber et al. | |
| 2009/0145074 | A1 * | 6/2009 | Tsukamoto | E04C 5/04 52/686 |

OTHER PUBLICATIONS

International Preliminary Report on Patentability dated Mar. 3, 2015 issued in corresponding PCT/EP2013/064956 application (pp. 1-7).

\* cited by examiner

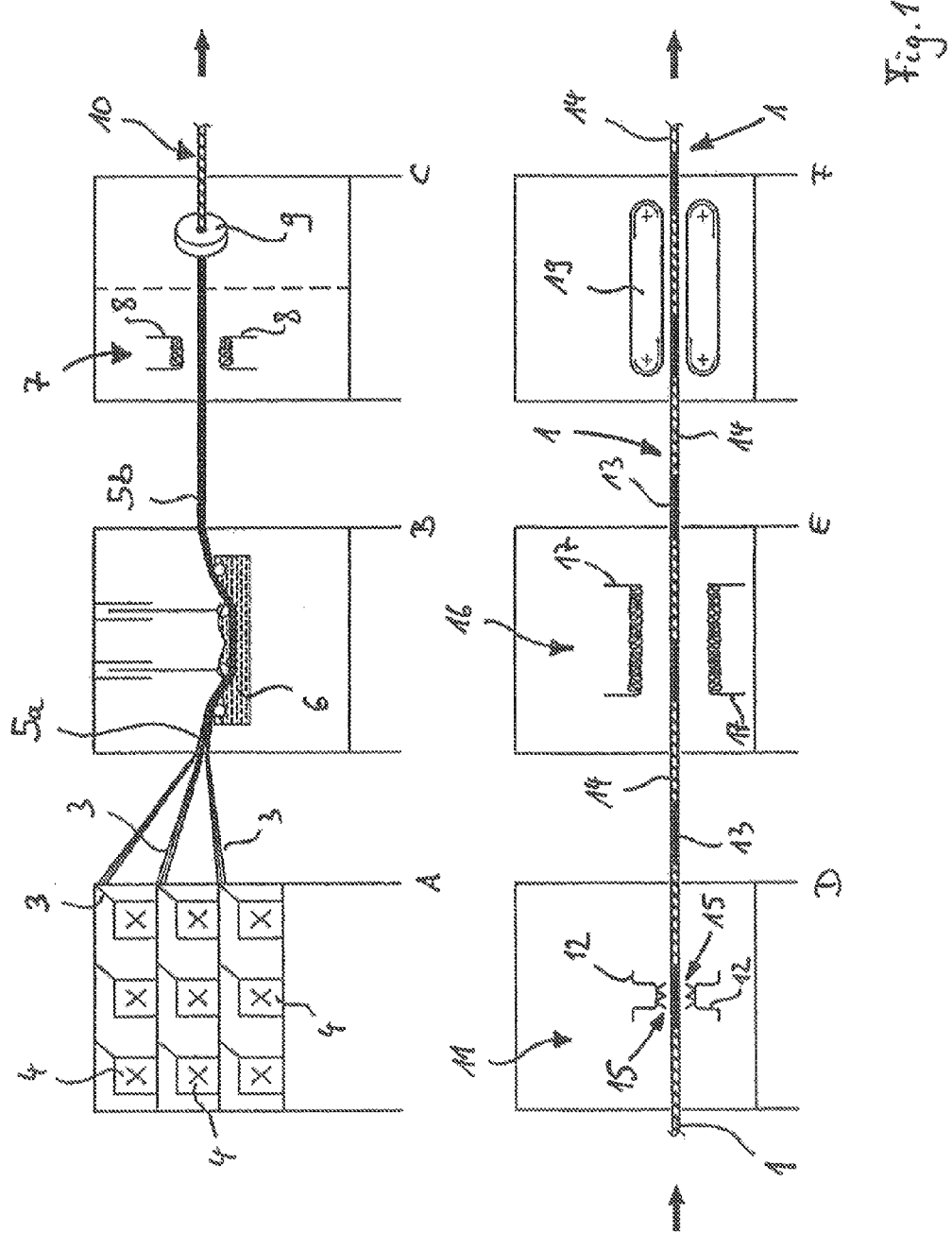

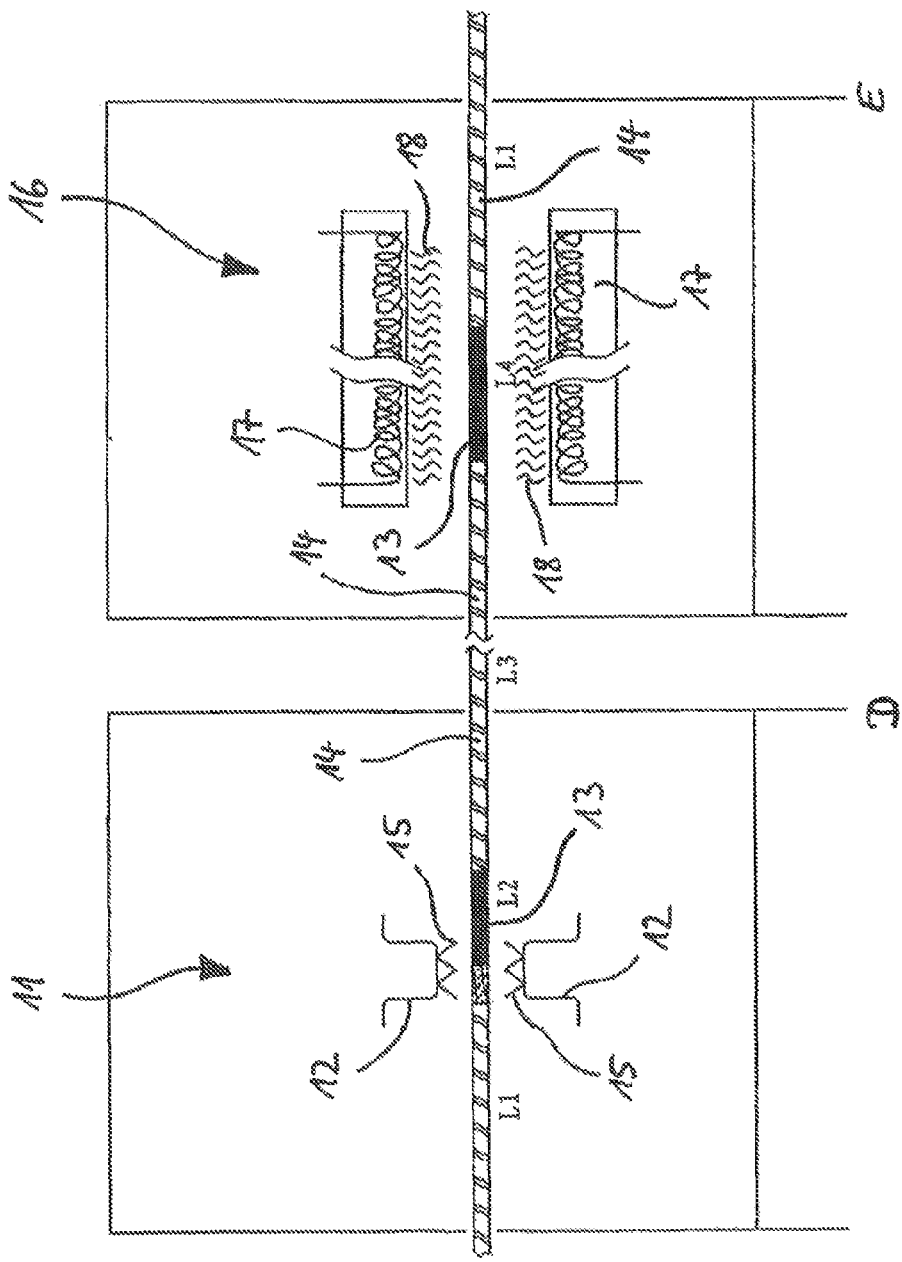

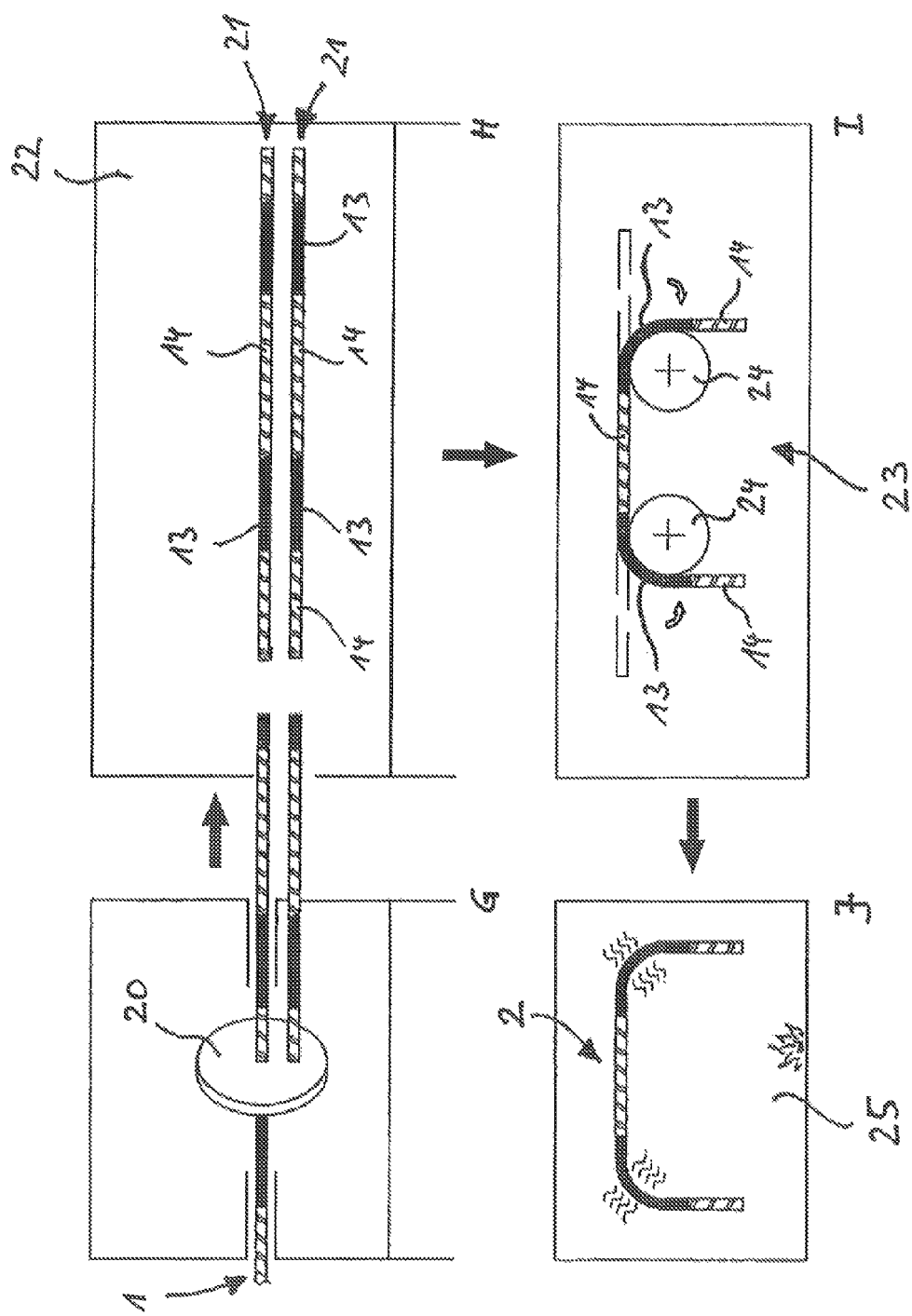

METHOD FOR PRODUCING REINFORCEMENT ELEMENTS FROM FIBRE-REINFORCED PLASTIC

The present invention concerns a method for the manufacture of reinforcing members consisting of fibre-reinforced plastic for mineral construction materials, in particular for concrete, in accordance with the preamble of claim 1. Here in a manner known per se a multiplicity of fibres are impregnated with plastic and in a first stage of curing are pre-cured by the supply of heat and/or radiation up to a certain level to form a composite fibre rod. The fibres can preferably consist of aramid, basalt, glass or carbon, and a hot-cure thermosetting plastic is preferably deployed as the plastic. If the pre-cured composite fibre rod thus obtained is longer than the length required for the reinforcing member, it is cut to the required length and subsequently brought into the shape desired for the reinforcing member for the manufacture of pre-forms such as, e.g., straps or hooks. Finally the reshaped composite fibre rod is cured in a final stage of curing by the supply of heat and/or radiation, whereby the curing process can also take place directly in a moulding tool that can be heated.

This method is generally of known art, as is the deployment of reinforcing members made from fibre composite materials. By virtue of their lower weight and lower costs and also, above all, by virtue of the lack of susceptibility to corrosion, reinforcing members made from fibre-reinforced plastic are increasingly deployed instead of conventional steel reinforcements for components or buildings made from concrete. Here the reinforcing members can be shaped from a single composite fibre rod, or they can consist of a plurality of composite fibre rods that are connected with one another. Such rod-shaped reinforcing or armouring elements are described, for example, in DE 101 08 357 A1, DE 102 13 153 A1, DE 20 2006 017 392 U1, or in DE 10 2009 054 894 A1, as are methods for their manufacture. These documents can be referred to for further details.

Thus from DE 101 08 357 A1 an armouring rod for mineral construction materials, in particular for concrete, is of known art, as is a method for its manufacture. The armouring rod consists of an elongated skein of fibre-reinforced plastic, whereby the reinforcing fibres are formed as longitudinal fibres and run continuously along the skein.

From DE 102 13 153 A1 a reinforcing rod of fibre-reinforced plastic for concrete construction is of known art, as is a method for its manufacture in accordance with the pultrusion method. Here the plastic profile is produced using permanent shuttering consisting of plastic.

Also from DE 20 2006 017 392 U1 various components made from fibre-reinforced plastic as the reinforcement of bodies made from mineral hydraulically cured mixtures such as concrete are of known art.

From DE 10 2009 054 894 A1 a method for the manufacture of fibre composite structures is of known art, in which a fibre structure is impregnated with resin and a fibre composite is formed, which in the first instance is pre-shaped into a semi-finished product, and finally is reshaped into a definitive configuration by the direct introduction of energy by means of microwaves.

What is disadvantageous in all the manufacturing methods of known art up to the present time is, however, the fact that the mechanical and/or chemical and/or geometrical properties of the reinforcing members in the reshaped regions do not match with the properties of the regions that after the pre-curing executed in the first stage are not reshaped any further. Thus as a result of the reshaping process, for example, the cross-sectional shape, the fibre content, the alignment of the fibres, the resin-fibre ratio and/or the strength with respect to tensile, bending or shear loadings alter relative to the straight rod material. For this reason elements with reshaped regions for reinforcement applications cannot be used directly, but rather the pre-forms with reshaped regions must be tested, measured and certified as a stand-alone material separately from the straight rod material. This is associated not only with increased labour, but also, above all, with higher costs.

The object of the present invention is therefore to create a method of the type cited in the introduction, which avoids the disadvantages cited and allows the manufacture of reinforcing members made from fibre-reinforced plastic, which also in reshaped regions fulfil the required minimum properties with regard to strength, E-modulus, bonding behaviour and durability, at least nearly as well as in the regions that have not been deformed.

According to the invention this object is achieved by a manufacturing method in accordance with claim 1. Advantageous configurations and developments of the invention ensue from the dependent claims.

What is essential in the inventive solution is that the curing of the composite fibre rod takes place in at least three stages of curing sequencing one after another, whereby after the first stage of curing covering agents with radiation-reflecting and/or thermally insulating properties are applied over individual axial sections of the pre-cured composite fibre rod; in each case these cover the composite fibre rod in individual sections over part of its periphery, or over its whole periphery. Along with the application of these covering agents over some sections a second stage of curing of the composite fibre rod is then executed, in which the composite fibre rod is further cured in the regions not covered by the covering agents by the supply of heat and/or radiation. What is essential here, moreover, is that the deformation of the composite fibre rod takes place between the second stage of curing and the final stage of curing.

What is important, therefore, is that an additional intermediate step is provided for purposes of curing the composite fibre rod, in which at least one individual region of the composite fibre rod, previously only pre-cured, is further cured than in other regions. Here, in the additionally executed second stage of curing, the composite fibre rod is only further cured in the exposed regions next to or between the applied covering agents. By this means before the deformation of individual sections the composite fibre rod can be translated into an intermediate product with various levels of curing; this allows a significantly improved reshaping process with mechanical and chemical properties that are as constant as possible.

Advantageously the already pre-cured composite fibre rod is only deformed in the regions that were covered by a covering agent in the second stage of curing. What is thereby achieved is that the straight rod sections adjacent to a region that is to be reshaped are further, or even completely, cured throughout in the additionally executed second stage of curing, and during the subsequent deformation of the sections that are located in between them, do not experience any further significant alterations of their properties.

An essential advantage of the inventive method consists in the fact that in this manner a primary product is created, which before final curing can immediately be further processed by means of shaping to form the various reinforcing members that are required in various reinforcement applications. Thus any shape of reinforcing members, in particular open or closed straps, can be manufactured, which over their whole extent, even in the reshaped regions, have properties which remain virtually the same as those of the comparable straight rod materials. These include, for example, constant profiling, constant roundness, constant fibre content, and constant mechanical and/or chemical properties.

The covering agents can be applied onto the pre-cured composite fibre rod as mechanically acting agents and/or preferably in a fluid or paste form.

Thus the covering agents can, for example, comprise heat-reflecting and/or radiation-reflecting, pre-shaped profiled parts with concave recesses, in which the individual sections of the pre-cured composite fibre rod are enclosed, preferably in a form fit.

Likewise the covering agents can comprise heat-reflecting and/or radiation-reflecting foil, in particular aluminium foil, which is wound around the individual sections of the pre-cured composite fibre rod.

In the case of these covering agents it is advantageous if, after the execution of the second stage of curing, they are at least partially removed once again from the composite fibre rod.

It is particularly advantageous if the covering agents include ink or paint, which is applied as a heat-reflecting and/or radiation-reflecting coating onto the individual sections of the pre-cured composite fibre rod. By this means a particularly simple and rapid application of the covering agents can be achieved.

Here the covering agent can be applied in a particularly simple manner, by spraying a paint with metal pigments, for example silver bronze, onto the respective sections of the pre-cured composite fibre rod. Such a paint is particularly well suited to be a reflective agent.

A further option is for the covering means to comprise a coating in the form of a gel or wax, which is applied as a heat-reflecting and/or radiation-reflecting coating onto the individual sections of the pre-cured composite fibre rod.

Here the above-cited covering agents can in each case be deployed as alternatives, or in combination with one another.

In a particularly preferred form of embodiment of the invention provision is made for the covering agent to be applied as a reflective agent onto the composite fibre rod, which agent possesses radiation-reflecting and thermally-permeable properties. Here the composite fibre rod is further cured in the second stage of curing by the introduction of radiation energy, preferably in the form of IR-radiation, whereby the radiation is reflected from the regions covered by the radiation-reflecting reflective agents, so that the composite fibre rod is only further cured in the exposed regions. Subsequently in the final stage of curing the composite fibre rod is cured not by radiation, but by the supply of heat, generated for example in a furnace, whereby the said thermal energy passes through the previously applied radiation-reflecting and thermally-permeable reflective agent, so that the composite fibre rod can also be fully cured in the regions covered by reflective agents. This variant of embodiment offers the advantage that the reflective agent applied for the second stage of curing also can remain on the composite fibre rod during the final stage of curing and does not need to be removed once again in a separate step, which significantly reduces both the labour and the costs.

A particularly good grip of the reinforcing member in concrete can be achieved by profiling the surface of the pre-cured composite fibre rod in a manner known per se. In the inventive method it is favourable if this profiling takes place before the application of the covering agents. Alternatively the fully cured composite fibre rod can be mechanically machined, for example, by means of grinding or milling.

Here it is particularly advantageous if at least one fibre skein is wound around the pre-cured composite fibre rod in a manner known per se, such that the surface of the composite fibre rod has constricted regions with raised ribs that are located in between them. Here the fibre skein can advantageously be wound around the pre-cured composite fibre rod such that a thread-shaped surface structure ensues. Thus the reinforcing members have an external configuration, which is designed in the form of a profile that can be screwed in as required. Advantageously the fibre skein wound tightly around the composite fibre rod can also remain on the rod after final curing on the bases of the thread turns. Also when applying the inventive method this profiling remains virtually unaltered in the reshaped regions so that the requirements on the bonding behaviour in concrete can be fulfilled without any problems, even in curved regions of a reinforcing member.

The surface of the composite fibre rod can also be coated with powder or sand, so as to improve the grip of the reinforcing member in a mineral construction material.

In a particularly preferred form of embodiment of the invention provision is made for the reinforcing member to be produced from a composite fibre rod generated by pultrusion; this is manufactured continuously and before the reshaping process is cut to the desired lengths for the respective reinforcing members. Here the continuously moving composite fibre rod, with the covering agents applied on some sections, moves through the second stage of curing. In this manner a particularly economical form of production can be achieved, in which the regions of the continuously moving composite fibre rod that are later to be deformed also moving through the whole process.

Here it is of particular advantage that intermediate products are continuously generated; these can be shaped particularly easily into various reinforcing members whilst retaining their geometric, mechanical and/or chemical properties. Also by suitable application, including cyclic application, of the covering agents onto the continuously moving composite fibre rod, both fully cured rod elements and also intermediate products that are still partially or completely to be reshaped can be manufactured continuously, or alternately one behind another, in a single process. Thus for a fully cured rod element no covering agent is applied over a region corresponding to its length, while for an intermediate product located immediately ahead and/or behind the former, which is later to be partially reshaped into a reinforcing member, covering agents are applied, preferably are sprayed on, at the appropriate sites. Likewise in this continuously moving process intermediate products can also be manufactured that are provided with covering agents over their whole length, and thus remain deformable over their whole length for later reshaping processes. In particular this represents a great advantage, because after final curing thermosetting resins can no longer be softened by subsequent heating and can no longer be further reshaped.

The cutting to length and deformation of the composite fibre rod sections of the composite fibre rod continuously generated in the pultrusion process advantageously takes place between the second stage of curing and the final stage of curing. The composite fibre rod sections that have been brought to the desired length can then be two-dimensionally, or three-dimensionally, reshaped in the regions previously covered by covering agents so as to form the reinforcing member.

The subject of the present invention is also a reinforcing member made from fibre-reinforced plastic for mineral construction materials, in particular for concrete, which is manufactured in accordance with the above-described method.

In a preferred form of embodiment the reinforcing member is embodied in the form of a strap with at least one reshaped curved region. Such a strap preferably has two curved regions located in a plane, in each of which the composite fibre rod is curved with a desired radius, which in particular can lie between 1.5 times and 5 times the diameter of the rod, and which is curved through at least some 90°. Here, even in these corner regions, the strap has properties that are virtually unaltered compared with its straight rod sections, and in particular has a constant thread structure.

Further advantages and features of the invention ensue from the following description and the example of embodiment represented in the figures of an inventive method sequence.

Here:

FIG. 1: shows a schematic representation of six process steps A to F of an manufacturing method according to the invention, FIG. 2: shows an enlarged representation of the steps D and E in FIG. 1, and FIG. 3: shows a schematic representation of four further process steps G to J of the manufacturing method in FIG. 1.

In the inventive method represented in the figures a composite fibre rod 1 is continuously manufactured by pultrusion, from which individual reinforcing members 2 are later generated. For this purpose numerous fibres 3, which are wound as rovings from many filaments onto a plurality of spools 4 (step A), are brought together and as a fibre bundle 5a, with a unidirectional fibre orientation running in the longitudinal direction of the rod profile, are impregnated in a plastic bath 6 (step B). As fibres glass fibres, aramid fibres, carbon fibres, silicon carbide fibres, or boron fibres can, for example, be deployed, which in the plastic bath 6 are surrounded by a matrix of plastic resin.

The fibre bundle 5b thus obtained, still soft and impregnated with liquid resin, then moves through a first stage of curing 7, in which, by the supply of heat by means of a radiation heater 8, it is pre-cured to form a composite fibre rod 1 (left-hand side of step C). The said composite fibre rod 1 is only pre-cured to the extent that it is no longer dripping wet and can still be easily reshaped. Immediately afterwards the surface of the composite fibre rod 1 is wound tightly with a fibre skein 9 continuously rotating in a plane running transverse to the longitudinal direction of the rod, so that it receives a thread-type surface structure 10 (right hand side of step C).

The composite fibre rod 1, continuously moving forward, then receives on some sections a coating of a radiation-reflecting silver bronze in a paint cabin 11. To this end the silver bronze is sprayed by means of a spraying unit 12 controlled by a control unit onto individual axial sections 13, in each case over the whole periphery of the composite fibre rod 1. Between each of the said sprayed sections 13 individual sections 14 are omitted, which are not covered with the silver bronze (step D). Here the sequence and the axial lengths L1, L2, L3 and L4 of the individual sections 13 and 14 can be automatically controlled by means of the control unit (FIG. 2).

The silver bronze applied onto the sections 13 of the composite fibre rod 1, continuously moving forward, serves as a reflective agent 15, which reflects the radiation energy; in the second stage of curing 16, through which the rod inventively additionally moves, infrared radiation 18 is supplied to the composite fibre rod 1 by means an infrared heating unit 17. The IR-radiation is thus reflected from the sections 13 coated with silver bronze, so that the composite fibre rod 1 can only be further cured, or fully cured, (step E) in the sections 14 located in between them that are free of silver bronze. After the execution of this second stage of curing 16 the continuously moving composite fibre rod 1 therefore has alternating hard regions 14 and soft regions 13 that can still be reshaped.

In the example of embodiment represented the pulling unit 19 is arranged behind the second stage of curing 16; as a tractor this pulls the composite fibre rod 1 in a manner known per se continuously through the individual process stations (step F).

Behind the pulling unit 19 is located a saw 20, similarly controlled by a control unit, with which the continuously moving composite fibre rod 1 is automatically severed into individual rod sections 21; in each case these have the desired lengths for the reinforcing members (step G).

The rod sections 21 thus obtained are temporarily stored in a magazine 22 (step H). Each has two soft regions 13 that can still be reshaped, and three regions 14 adjacent to them that have already been cured in the second stage of curing 15. Straight reinforcing members, not represented in the figures, that have been fully cured, or also, in another arrangement, reinforcing members divided into soft and hard regions, can also be severed here, for example, and separately stored, i.e. temporarily stored.

After temporary storage in the magazine 22 the individual rod sections 21 are brought in a reshaping unit 23 into the strap configuration desired for the reinforcing members 2 (step I). To this end, in the example of embodiment represented here, the rod sections 21 in each of the two regions 13 that are still soft are reshaped, in each case through 90°, with the aid of two reshaping rollers 24 to form a reinforcing strap. Here each of the two reshaped regions 13 is located in each case between two regions 14 already cured in the second stage of curing 15.

Finally the reshaped rod sections 20 are cured in a final stage of curing 25 by the supply of heat from a combustion process into the regions 13 that up to this point are still soft; in order thus to obtain the reinforcing members 22 (step J), now fully cured as a whole.

The invention claimed is:

1. A method for the manufacture of a reinforcing member (2) consisting of fibre-reinforced plastic for mineral construction materials, in particular for concrete, comprising the following steps:

a multiplicity of fibres (3) is impregnated with plastic, the fibres (5b) enclosed by plastic are pre-cured in a first stage of curing (7) by the supply of heat and/or radiation to form a composite fibre rod (1), if necessary, the composite fibre rod (1) is cut to the length that is desired for the reinforcing member (2), the pre-cured composite fibre rod (1) is brought into a shape desired for the reinforcing member (2), the composite fibre rod (1) is cured in a final stage of curing (25) by the supply of heat and/or radiation, characterised in that the curing of the composite fibre rod (1) takes place in at least three stages of curing (7, 16, 25) sequencing one after another, in that after the first stage of curing (7) at least one radiation-reflecting and/or thermally-insulating covering agent (15) is applied onto the pre-cured composite fibre rod (1), over at least one individual section (13) of the composite fibre rod (1), which covering agent covers the composite fibre rod (1) on the said at least one section (13) over at least a part of its periphery, wherein a second stage of curing (16) of the composite fibre rod (1), together with the covering agent(s) (15) applied on some sections, is executed, in which the composite fibre rod (1) is further cured in the regions (14) not covered by the covering agents (15) by the supply of heat and/or radiation, and in that the deformation (23) of the composite fibre rod (1) is executed between the second stage of curing (16) and the final stage of curing (25).

2. The method in accordance with claim 1, characterised in that the pre-cured composite fibre rod (1) is deformed in the regions (13) that are covered by a covering agent (15) in the second stage of curing (16).

3. The method in accordance with claim 1, characterised in that the covering agents (15) are applied mechanically and/or in fluid form.

4. The method in accordance with claim 1, characterised in that the covering agents (15) comprise heat-reflecting and/or radiation-reflecting, pre-shaped profile parts, in which the individual sections of the pre-cured composite fibre rod (1) are located in preferably in a form fit manner.

5. The method in accordance with claim 1, characterised in that the covering agents (15) comprise a heat-reflecting and/or radiation-reflecting foil, in particular aluminium foil, which is wound around the individual sections (13) of the pre-cured composite fibre rod (1).

6. The method in accordance with claim 1, characterised in that after the execution of the second stage of curing (16) the covering agents (15) are at least partially removed again.

7. The method in accordance with claim 1, characterised in that the covering agents (15) include ink or paint, which is applied as a heat-reflecting and/or radiation-reflecting coating onto the individual sections (13) of the pre-cured composite fibre rod (1).

8. The method in accordance with claim 7, characterised in that silver bronze or a metallic paint is sprayed onto the individual sections (13) of the pre-cured composite fibre rod (1).

9. The method in accordance with claim 1, characterised in that the covering agents (15) comprise a coating in the form of a gel or wax, which is applied as a heat-reflecting and/or radiation-reflecting coating onto the individual sections (13) of the pre-cured composite fibre rod (1).

10. The method in accordance with claim 1, characterised in that radiation-reflecting and thermally permeable reflective agents are applied as covering agents (15), wherein in the second stage of curing (16) the composite fibre rod (1) is further cured by the introduction of radiation energy (18) only in the regions (14) that are not covered by reflective agents (15), and wherein in the final stage of curing (25) the composite fibre rod (1) is cured by the use of heat, even in the regions (13) covered by the reflective agents (15).

11. The method in accordance with claim 1, characterised in that the surface of the pre-cured composite fibre rod (1) is profiled before the application of the covering agents (15).

12. The method in accordance with claim 11, characterised in that at least one fibre skein (9) is wound in the form of a screw around the pre-cured composite fibre rod (1), such that the surface of the composite fibre rod (1) has constricted regions and ribs with a thread-form surface structure (10) that are located in between them.

13. The method in accordance with claim 1, characterised in that the surface of the composite fibre rod (1) is coated with powder or sand.

14. The method in accordance with claim 1, characterised in that the reinforcing member (2) is produced from a composite fibre rod (1) generated by pultrusion, which is continuously manufactured at least over a particular time period, and before reshaping (23) is cut to the desired lengths for the reinforcing members (2), wherein the second stage of curing (16) is undergone with covering agents (15) applied onto the composite fibre rod (1) on some sections.

15. The method in accordance with claim 14, characterised in that the cutting to length (20) and deformation (23) of the composite fibre rod sections (21) takes place between the second stage of curing (16) and the final stage of curing (25).

* * * * *